United States Patent Office 3,455,409
Patented July 15, 1969

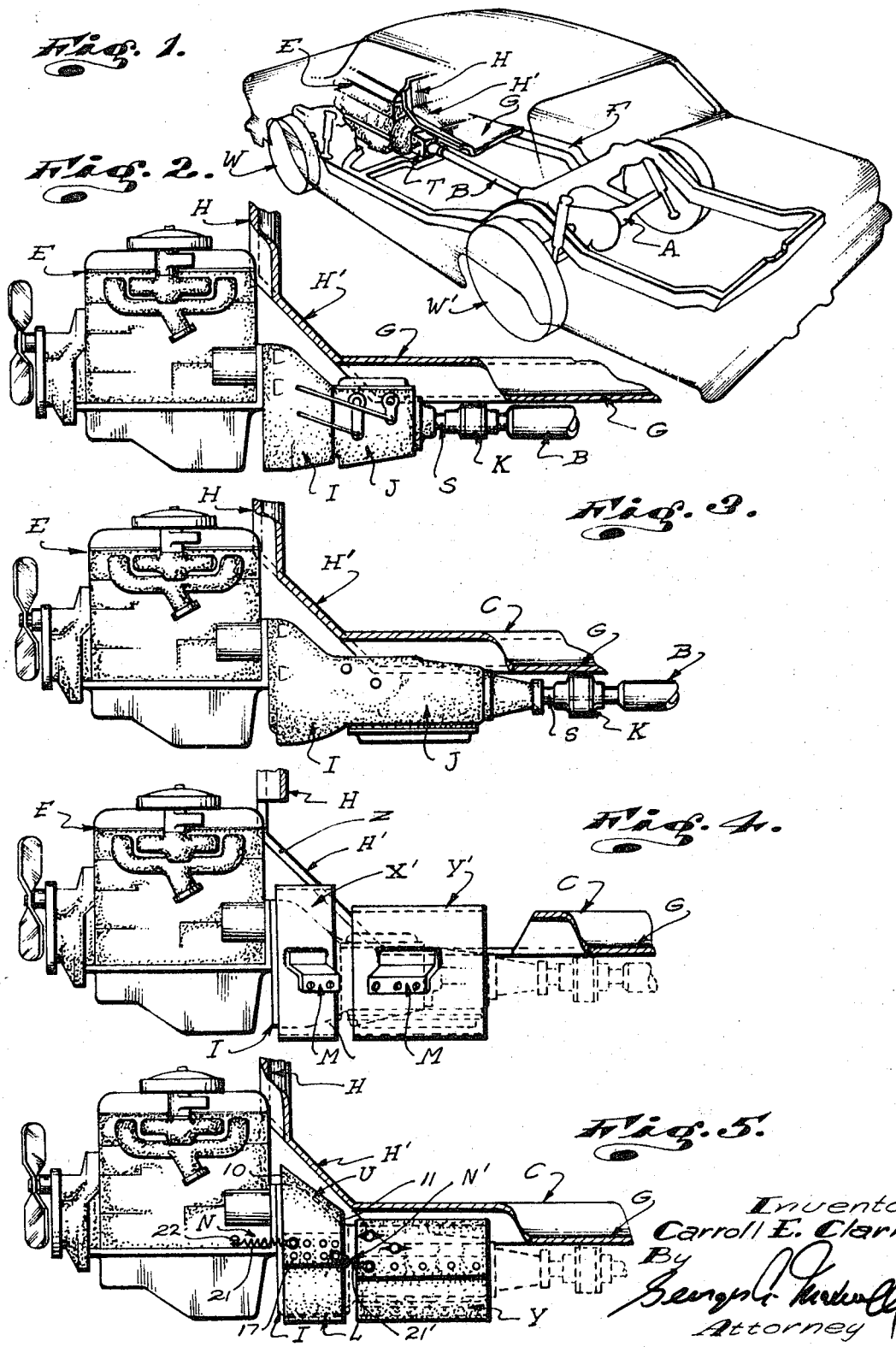

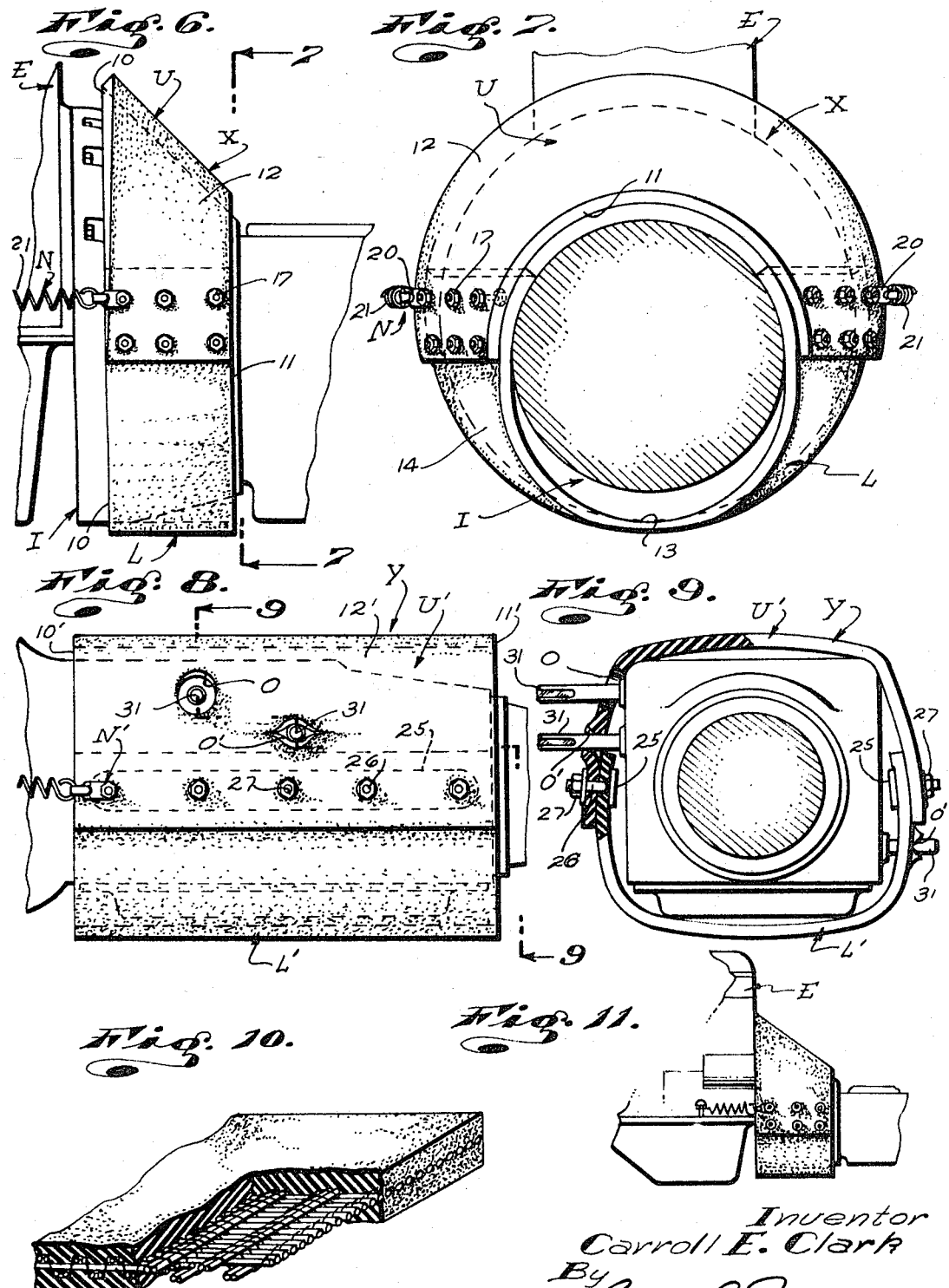

3,455,409
TRANSMISSION SHIELD
Carroll E. Clark, Long Beach, Calif. (% Trans-Dapt of California, Inc., P.O. Box 4157, Compton, Calif. 90224)
Filed Apr. 7, 1967, Ser. No. 629,184
Int. Cl. B60k 17/00; B60t 7/00
U.S. Cl. 180—82                    11 Claims

ABSTRACT OF THE DISCLOSURE

The combination of an automobile frame, engine, transmission, body, and transmission shields wherein said frame includes a pair of elongate, laterally spaced, parallel frame members, said engine is arranged between and supported by said frame members, said transmission includes a bell housing on said engine and a gear box on said housing and extending from the engine and longitudinally between the frame members, said body includes a floor structure carried by the frame members to extend therebetween and overlie the transmission, and a fire wall structure projecting upwardly from the floor structure adjacent the engine, said shields including elongate, flexible, shields of rubber with fabric cores and engaged about the bell housing and/or gear box, and the adjacent floor structure and frame members, and means to releasably maintain the shields in position about their related bell housing and/or gear box.

---

In the automobile racing art there has been a great increase in the number of competitive events in which production automobiles or so-called "stock cars" are used for racing and other allied competitive events. The term "stock cars," in addition to unmodified, conventional production automobiles, includes production automobiles that have been modified and "hopped up" for racing and competitive purposes.

A major danger in racing such automobiles is the tendency for the power transmission means, between the engine and the drive shaft coupled with the rear end, to fail. In the case of manually operated power transmission means, which means includes a bell housing on the engine and in which a fly wheel and clutch mechanism is housed and with which a gear box is connected, the fly wheel and clutch mechanism present weak spots which are subject to failure. In the case of automatic transmissions, the gear train is coupled with the engine by a torque converter which is not subject to failure, but the transmission or gear box, per se, includes planetary gears and the like which, when operated at high speed, are subject to failure.

When such power transmission means are overstressed and fail, particularly in high speed operation, the moving parts within their related housing structures disintegrate or move out of place and at such rates of speed that they are propelled and projected through their related housing structures and other surrounding or adjacent objects, subjecting those persons operating the automobiles and spectators in the vicinity of the automobiles to an unreasonable risk or harm.

When a power transmission means fails in the manner set forth above, it is said to "explode" and is not unlike a military explosive projectile, projecting shrapnel-like fragments radially of its axis of rotation.

As a result of the great danger resulting from power transmission failure, in racing automobiles, certain organizations involved in the promotion, sponsoring and/or management of auto races and allied competitive events have required that the clutch or bell housing and/or the gear boxes of automobiles be shielded according to strict specifications, before such vehicles are permitted to enter competition.

Due to the noted risk and dangers involved, it is anticipated that those organizations which have not yet required such shielding of transmissions will, in the near future, adopt such requirements since the frequency and experience of such transmission failures is increasing rapidly and in direct proportion to the increased performance being gained in such automobiles, as a result of the "hopping up" and modification of such automobiles.

The presently required shielding involves quarter-inch steel plate formed and fabricated to establish a sleeve-like shield which is freely engageable about the bell housing and/or gear box of an automobile. The shield must be bolted or otherwise secured in fixed position to the automobile frame. Such shields weigh approximately 100 pounds and normally require an excess of ten man-hours of skilled labor and the use of special tools and equipment to form, fabricate and install them. As a result, such shields are normally quite costly.

Further, since steel shields of the character referred to are rigid and must be secured in fixed position relative to the automobile frame with which they are related, they must be of such size and extent and must provide such clearance about the transmissions that they will not engage and interfere with the normal rocking and/or movement of the engines and transmissions relative to the frames of the vehicles.

As a result of the foregoing requirements, there are a number of makes of automobiles on, or in which, such shields cannot be mounted, which automobiles, as a result, cannot be used in competition.

Still further, as a result of the size and the manner in which such shields must be fixed in position and as a result of the close tolerances between the transmission and the floor and/or fire wall, structures must be cut away and removed in order to accommodate such shields.

When the ordinary shield of the character referred to must be removed to provide access to its related transmission, as for the purpose of repair or service, many man-hours of skilled labor must be expended to remove the shield and also to re-install it.

While it has been determined that shields of the character referred to greatly or materially reduce the risks involved, they are not wholly satisfactory as steel plate, rigidly mounted, has little shock absorbing qualities and the shrapnel-like fragments and pieces of an exploding transmission have been known to substantially freely penetrate such shields.

Considerably heavier steel plate would be required to assure safety and, accordingly, it is assumed that the normal one-quarter inch plate requirement was arrived at as a compromise between cost, weight, and safety factors.

Still further, fragments of clutch and bell housing tend to ricochet within and out of such steel shields, rendering such shields of questionable value.

An object of my invention is to provide a new transmission shield which overcomes the various shortcomings and disadvantages found in the above-noted standard, presented employed steel shield constructions.

More specifically, the objects of my invention include the provision of a shield which weighs less than one-tenth the weight of conventional shields; a shield which can be applied to and removed from engagement about a transmission in fifteen to thirty minutes without the exercise of special skill, and a shield which can be related to the transmission of a conventional automobile construction without requiring cutting and removing or otherwise varying or modifying parts and/or portions of the automobile construction.

It is an object of the invention to provide a light weight, inexpensive and easy to install shield of the character referred to which has extremely high shock absorbing qualities and is many times more effective and capable and withstanding those forces encountered from an exploding transmission than conventional steel shields, and which is such that it tends to prevent ricocheting of fragments impinging upon it.

An object of my invention is to provide a shield structure for the purpose referred to which can be marketed for and which is substantially less costly than conventional steel shields.

A feature of the present invention is to provide a shield structure for the purpose referred to made of flexible, resilient, sheet rubber, or synthetic rubber, having a central sheet or core of straight warp and filler fabric bonded therein. More specifically, it is a feature of the invention to establish a shield of that type of rubber sheeting manufactured by United States Rubber Company and sold under the trade name "Usflex."

In the case of steel shields of the character referred to, the shields not only fail to deaden the sounds issuing from the transmissions with which they are related, but tend to amplify such sounds and are extremely undesirable as a result thereof.

An object of the present invention is to provide a shield which, in addition to the primary purpose set forth above, serves as a sound-absorbing and/or deadening structure and effectively contains those extremely undesirable transmission sounds normally encountered during the operation of racing vehicles.

The various objects and features of my invention will be fully understood from the following detailed description of a typical preferred form and carrying out of my invention, throughout which description reference is made to the accompanying drawings, in which:

FIG. 1 is a perspective illustration of the general structure and arrangement of parts of an automobile construction with which my new shield is to be related.

FIG. 2 is a side elevational view of an automobile engine with a floor and fire wall structure related to it and showing a clutch housing and manually operable transmission related thereto.

FIG. 3 is a view similar to FIG. 2, but showing an automatic transmission related to the engine, fire wall and floor structures.

FIG. 4 is a view similar to FIG. 2 showing conventional plate steel transmission shields related to the engine, fire wall and floor structures of an automobile, and showing the transmission structures shown in FIGS. 2 and 3, in dotted lines.

FIG. 5 is a view similar to FIG. 4, but showing the new transmission shield structure provided by the present invention related to the engine, floor and fire wall structures and transmissions.

FIG. 6 is a side elevational view of a fly-wheel or bell housing with my new shield structure related to it.

FIG. 7 is a view taken as indicated by line 7—7 on FIG. 6.

FIG. 8 is a side elevation of a portion of an automatic transmission with my new shield related thereto.

FIG. 9 is a view taken substantially as indicated by line 9—9 on FIG. 8.

FIG. 10 is a perspective view of a portion of a preferred form of sheet rubber material employed to establish my new shield construction.

FIG. 11 is a view similar to FIG. 6, of reduced scale and showing a different relative positioning of parts.

The ordinary or stock car construction includes an elongate frame F with front and rear ends and involving a pair of laterally spaced, parallel, longitudinally extending rail members and laterally extending spreader members. Front wheels W are independently suspended from the front end of the frame, a transversely extending rear axle structure A related to the rear end of the frame and provided with rear wheels W', an engine E mounted at the front end of the frame between the rail members, a power transmission T fixed to and extending rearwardly from the rear of the engine and connected with the axle structure A by means of a drive shaft B, and a body on and about the frame and other referred-to parts and including a flat, horizontal floor structure G on the frame, rearward of the engine and extending transverse the frame and over the transmission and a vertical fire wall structure H extending laterally of the frame and projecting upwardly from the forward end or edge of the floor structure G, adjacent to the rear end of the engine E.

In accordance with conventional automobile construction, the fire wall structure H has a downwardly and rearwardly inclined portion H' which is integrally joined with the floor structure G and which serves to define a foot rest portion for persons driving and/or riding in the automobile.

Further, and in accordance with conventional automobile construction, the floor structure G is provided with a central, longitudinally extending, upwardly projecting and downwardly opening hump-like channel C to accommodate a portion of the transmission T which projects above the primary plane of the floor structure and to accommodate and permit vertical shifting of the drive shaft B. The hump-like channel is commonly referred to as a transmission and/or drive shaft tunnel.

The lower portion H' of the fire wall structure normally projects upwardly and forwardly to provide clearance for a bell housing of the transmission and in which a fly-wheel and clutch mechanism, or in which the torque converter of the transmission means is arranged, substantially as shown in the drawings.

Frequently, the plane of the upper and lower portions of the fire wall structure are so close to the rear end of the engine E and the bell housing portion of the transmission means that the central portions thereof must be formed to clear and extend about the rear end of the engine and over the adjacent portion of the bell housing, as is illustrated in the drawings.

In the case of manually operable transmissions, as shown in FIG. 2 of the drawings, the bell housing I is a separate substantially rearwardly divergent, truncated conical structure fixed to the rear end of the engine E and houses a fly-wheel and clutch mechanism (not shown). A gear box J, with suitable control shafts projecting from it, is fixed to and projects rearwardly from the bell housing and has a rearwardly projecting output shaft S connected with the drive shaft B by means of a suitable universal coupling K.

Normally, in the case of manually operable transmissions, the fly-wheel and clutch means associated with the gear boxes are subject to failures of a dangerous nature, while the gear trains, within the gear boxes are not likely to fail with dangerous consequences. Accordingly, shielding the bell housing is of primary importance and necessary, while shielding the gear boxes is of secondary importance and, in certain circumstances, if desired, can be dispensed with.

In the case of automatic transmissions, as shown in FIG. 3 of the drawings, the bell housing I' can, as illustrated, be formed integrally with the gear box J'. The gear box J', from a visual standpoint, distinguishes from the manual transmission or gear box J, in that it is considerably greater in longitudinal extent and is provided with a different number and arrangement of control shafts and the like.

In the case of automatic transmissions, the bell housing normally houses a fluid torque converter and is not subject to those forms of breakdown or failure which would create a risk of harm, but the gear boxes carry clutch and planetary gas means and systems which, when operated at high speeds, are subject to failures which can result in high risks of harm. Accordingly, in the case of automatic transmissions, shielding the gear boxes is necessary and of primary importance and shielding of the bell housing portions of the structures is of secondary importance and can, in some cases, be dispensed with.

It is to be noted, however, that there has been recent developments and/or innovations in the art of automotive transmissions in which conventional, clutch means have substituted for or incorporated with fluid torque converters and are such that shielding of the bell housings becomes of equal importance with shielding of the gear boxes.

In light of the foregoing, it will be apparent that transmission shielding, when required, may necessitate shielding of the bell housing portion of the transmission means, or shielding the gear box portion of such means, or shielding of both the bell housing and gear box portions of said means.

In the case of conventional, presently employed, steel plate transmission shielding structures, as illustrated in FIG. 4 of the drawings, the shielding means includes a forward or primary shield member X′ engaged about the bell housing of the transmission means and a rear or secondary shielding member Y′ engaged about the gear box of the transmission means. The members X′ and Y′ are sleeve-like members fabricated of plate steel; are substantially coextensive in axial extent with their related portions of the transmission means and are round, ovoid or rectangular in cross section so that they can be arranged about their respective portions of the transmission means with clearance.

The members X′ and Y′ are provided with suitable mounting brackets M to facilitate mounting said members in fixed position relative to the frame and about their related portions of the transmission means.

Since the shield members X′ and Y′ are rigid in nature and since they are fixed to the frame of the automobile with which they are related, they must be of considerable size and must provide for sufficient clearance about the transmission means to permit the transmission means to rock and move relative thereto. As a result of the noted requirement for clearance and as a result of the rigid nature of the members and the manner in which they must be mounted, the floor and fire wall structures of the automobile must be cut and removed, substantially as indicated at Z in FIG. 4 of the drawings, to facilitate installation of the members.

It will be apparent from the foregoing that the steel transmission shielding means presently employed in the auto racing art is replete with disadvantages and shortcomings.

The transmission shield construction provided by the present invention, as illustrated in FIGS. 5 through 10 of the drawings, includes a forward primary shield unit X and a rear secondary shield unit Y.

The units X and Y are established of relatively soft and flexible sheet rubber material having a central planar core of woven fabric as shown in FIG. 10.

The forward shielding unit X is an elongate, horizontally extending tubular structure having front and rear ends 10 and 11 and a side wall 12. The side wall 12 defines a substantially radialy inwardly disposed inner surface 13 and an outwardly disposed outer surface 14.

The shielding unit X is adapted to be engaged about the bell housing I of the transmission T and is formed so as to simulate the general configuration of a bell housing so it can be advantageously engaged about a bell housing without requiring that the floor and/or fire wall structures of the related automobile be cut away, removed or otherwise modified.

The bell housing of the ordinary automobile transmission, whether manually operable or automatic, has a substantially longitudinal, tubular side wall, the upper and side portions of which are radially inwardly and rearwardly inclined and the lower or bottom portion of which is substantially straight or radially inwardly rearwardly inclined at a much flatter angle than the side and upper portions and can, from a practical standpoint, be considered straight.

Accordingly, in carrying out the present invention, the upper half of the side wall 12 of the unit X, adapted to occur about the upper half of a related bell housing is radially inwardly and rearwardly inclined, while the lower half of the unit, adapted to occur about the lower half of a related bell housing is substantially straight or parallel with the longitudinal axis of the shield and bell housing.

In practice, the unit X is of such size that when the unit is engaged about a related bell housing and is urged forwardly relative thereto, the radially inwardly and forwardly disposed inner surface of the upper portion of the unit engages and is stopped against the radially outwardly and rearwardly disposed outside surface of the upper portion of the bell housing, as clearly illustrated in FIGS. 5, 6 and 7 of the drawings.

In practice, as illustrated in FIG. 11 of the drawings, the shield unit X can be somewhat greater in radial and axial extent relative to a related bell housing is then shown in FIGS. 5 and 6 of the drawings, and so that when it is urged forwardly relative to the bell housing, the upper portion of the forward edge 10 of the shield engages and stops against the rear end of the block of the engine E.

The shielding unit X is not intended to be tightly engaged about the bell housing with which it is related, but rather, fits loosely about the housing and in such a manner that considerable play and flexing of the shield, relative to the housing, is provided for.

In practice, and to facilitate manufacturing and installation of the shieding unit X, the unit X is established of two sections, there being an upper, inverted, substantially U-shaped section U and a lower U-shaped section L. The end or leg portions of the sections U and L are of sufficient longitudinal and/or circumferential extent so that they overlap one another, as clearly illustrated in FIGS. 6 and 7 of the drawings. The overlapping end portions of the sections U and L are provided with a plurality of registering openings in and through which suitable nut and bolt type fasteners 17 are engaged to secure the sections together.

In practice, the sections U and L are established in the form of elongate strips of rubber sheet stock and the upper section U is formed so that it is somewhat arcuate, longitudinally, so that its forward edge 10 is substantially longer than its rear edge 11 whereby that strip or section assumes the noted conical or inclined configuration when the sections are bolted together.

In addition to the foregoing, the shielding means that I provide includes a suitable retaining means N for retaining the unit X in desired relationship about the related bell housing. In the case illustrated, the retaining means N includes a hook-type clip 20 secured to each side of the unit by one of the adjacent nut and bolt fasteners 17 and an elongate helical tension spring 21 having one end engaged with each clip and its other end engaged with a suitable anchoring means 22, spaced forward of the bell housing. The anchoring means 22 can, as illustrated, consist of a simple screw fastener on the engine E.

It will be apparent that the means N normally yieldingly urges and maintains the shield unit X forward and in proper working position about the bell housing.

In practice, when it is desired to install the unit X, the upper section U, separate from the lower section L, is slidably engaged about the upper portion of the bell housing and between the housing and the adjacent floor/or fire wall structures of the automobile and so that the end portions of the section U occur at the opposite sides of the bell housing. One end of the lower section L is then secured and bolted to its related end of the upper section and, finally, the other end of the lower section is bolted and secured to its related end of the upper section.

It will be apparent from the foregoing that the shielding unit X can be easily and quickly engaged about a related bell housing without the expenditure of a great deal time or the exercise of any special skills and that the fire wall and/or floor structures of the vehicle need not be cut away or otherwise worked upon or modified.

It will be apparent that if the upper portion of the shielding unit X were not inclined, as illustrated, it could not be engaged between the bell housing and the floor and/or fire wall structures of the automobile.

The rear or secondary shielding unit Y provided by the present invention is a simple, straight, flexible tubular unit having front and rear ends 10' and 11' and a flexible side wall 12'. The unit Y is of sufficient circumferential extent so that it can be freely engaged about the gear box of the transmission means with which it is related, as clearly illustrated in FIGS. 8 and 9 of the drawings.

In practice, and as illustrated in the drawings, the unit Y is made up of two sections, there being an upper, inverted, substantially U-shaped section U' and a lower U-shaped section L'. The end or leg portions of the sections U' and L', as in the case of the shielding unit X, overlap and are secured together by suitable fastener means.

The fastener means employed to secure the sections U' and L' of the unit Y together is shown as including elongate plates 25 engaged with end of the inner surface of the lower section L', which ends occur inside the related ends of the outer section. The plates 25 have a plurality of substantially outwardly projecting, longitudinally spaced studs 26, which studs are engaged through registering longitudinally spaced openings in the sections U' and L'. Clamp nuts 27 are engaged on the outer ends of the studs and hold the sections of the unit in tight clamped engagement with each other.

It will be apparent that, in practice, the fastening means shown in FIGS. 8 and 9 of the drawings, can be replaced by simple nut and bolt type fasteners such as illustrated in FIGS. 6 and 7 of the drawings and that the simple nut and bolt type fastener means shown in FIGS. 6 and 7 of the drawings can be replaced by fastening means such as are shown in FIGS. 8 and 9 of the drawings, without departing from the spirit of this invention.

In practice, the shielding unit Y can be provided with suitably cut out apertures or openings O through which control shafts 31 projecting from the transmission can freely project or can be provided with suitable slit openings O' through which said shafts can project, as clearly illustrated in FIGS. 8 and 9 of the drawings.

The shielding unit Y, like the unit X, is provided with retaining means N' as illustrated in FIG. 8, which means, like the means N, can involve suitable hook clips secured to the unit by selected stud and nut assemblies of the means employed to secure the section U' and L' together and tension springs engaged with the clips and extending to suitable anchoring means forward of the shield Y, such as fasteners on the bell housing or similar clips on the forward shielding unit X. The means N' serves to yieldingly urge the unit Y forwardly into stopped engagement with the rearmost portion of the bell housing.

With the structure set forth above, it will be apparent that the unit Y can be engaged about a related transmission or gear box in the same manner or by following the same procedure as is followed in engaging the unit X about a related bell housing and that the floor structure of the automobile with its tunnel about and adjacent to the gear box need not be cut away or otherwise worked upon or modified.

It will be apparent that the unit Y, like the unit X, is not engaged tightly about the gear box, but is rather loosely and freely engaged about the box so as to allow for substantial flexing and relative shifting of the unit about and relative to the box.

While I have shown the units X and Y established of two sections, it will be apparent that each could be established of a single length of rubber sheet stock with its opposite ends secured together with a single set of fastening means. Such would not adversely affect or constitute a departure from the broader spirit of this invention.

The establishment of the units in two sections, as illustrated, makes installation somewhat easier in certain cases and is also more economical of material in the case of the bell housing unit X, as the upper section of that unit must, as previously explained, be especially formed to establish the desired conical configuration.

In the case of the units Y, the two section construction reatly facilitates engagement of the structure about the control shafts of automatic transmissions, particularly in those cases where such shafts project from opposite sides of the transmissions, as illustrated in FIG. 9 of the drawings.

In certain circumstances and if desired, the shield unit Y can be of sufficiently great circumferential extent so that the control shafts and related linkage can occur wholly within the unit, with the linkage extending longitudinally through and out from one end of the unit without departing from the spirit of this invention and in which case the cut out or slit openings O or O' for the shafts need not be established in the unit.

It is to be noted that the retaining means N and N' employed to hold the units X and Y in position need not include the hook type clips and springs, but can be comprised of one of the fasteners 17 or studs 26, and their related nuts, securing the sections together and any form of lanyard or tether, such as a length of wire, with a rear end fixed to the fastener or stud and its forward or free end secured to any anchoring structure in the automobile construction which is suitably located relative to the shields.

As indicated above and as desired, or as circumstances require, my shield can be made up of or include one or the other or both of the units X and Y.

The rubber sheet material employed in carrying out my invention (the term "rubber" includes synthetic rubber compounds and the like) is that product manufactured by United States Rubber Company and sold under the trade name "Usflex," or any other rubber sheet product having similar characteristics with respect to strength and cohesion, weight, flexibility, shock load distribution and fragment retention.

The particular material referred to above, and other similar materials which might possess the desired characteristics, is a simple, flat sheet of relatively soft and flexible rubber approximately ⅝ of an inch in thickness and has a single central planar lamination or core of special or unique fabric of high tensiled strength fiber, such as nylon. The term "fibers" as here employed means filaments, strands, wires and the like. The fabric core is unique in that the warp fibers and filler fibers are not interwoven, but rather, are arranged in parallel relationship, with the warp fibers being arranged in substantial juxtaposition and filler fibers, which are normal to the warp fibers, are arranged in groups containing a limited number of fibers, for eample, two or three fibers, in substantial juxtaposition and arranged alternately above and below the warp fibers in longitudinal spaced relationship to the warp fibers The warp and filler fibers thus arranged are not bent or crimped so as to adversely affect their strength.

The warp and filler fibers are secured and maintained in their proper relationship by a binder system of lighter weight fibers woven between and about the warp and filler fibers in such a manner to normally prevent displacement of the warp and filler fibers and such that forces exerted upon and through the warp and filler fibers at one point in the plane of the material are transmitted and distributed by the binding system to the warp and filler fibers substantially throughout the plane of the material. The binder system serves to prevent displacement of warp and filler fibers as by lateral separation of adjacent warp and filler fibers, which separation would permit penetration of an object through the material.

Core fabrics of the general character referred to above can be established with different combinations and relationships of wrap and filler fibers and with different forms of binder systems. Accordingly, it is to be understood that "Usflex is referred to as an example of one commercially available material suitable for carrying out my invention and is not intended to be limiting.

The type of core material specified can be made substantially equal in weight to 42 ounce cotton duck, but such material would be equivalent in strength to at least eight plies of such duck.

It is to be noted that eight plies of 42 ounce duck in a ⅝ inch rubber sheet would result in a sheet which would be so stiff that it could not, if employed in carrying out the present invention, be flexed and advantageously engaged about a transmission and would, due to reduced flexibility, have materially poorer shock absorbing characteristics.

Further, plural fabric laminates are inherently subject to ply separation and internal chaffing, which shortcomings are not to be found in the single ply, straight fiber type of fabric employed in carrying out this invention.

Having described only a typical preferred form and application of my invention, I do not wish to be limited or restricted to the specific details herein set forth, but wish to reserve to myself any modifications and/or variations that may appear to those skilled in the art.

Having described my invention, I claim:

1. In combination, an elongate automobile engine with front and rear ends, an elongate transmission extending rearwardly from the engine and including an elongate rearwardly convergent, truncated, substantially conical bell housing fixed to and projecting rearwardly from the rear of the engine and an elongate gear box projecting rearwardly from the ball housing and said housing and gearbox enclosing rotary elements driven by said engine, shielding means including an elongate tubular shield of flexible rubber sheet material loosely engaged about and enveloping said transmission, anchoring means on said engine and spaced from said shield and retaining means connected with an extending between the shield and anchoring means to maintain said shield in substantially fixed longitudinal relationship about the transmission, said rubber sheet material having a central planar core of fabric which yields and stretches in directions normal to its plane when subjected to forces applied normal to its plane due to the failure of said housing and gear box upon disintegration of said driven elements.

2. A combination as set forth in claim 1 wherein the elongate tubular shield is substantially equal in longitudinal extent with the bell housing and is substantially rearwardly convergent whereby said shield substantially conforms to the exterior configuration of the bell housing of the transmission.

3. A combination as set forth in claim 1 wherein the shield is divided longitudinally into front and rear units, said front unit being substantially equal in longitudinal extent with the bell housing and rearwardly convergent whereby said shield unit conforms generally to the exterior configuration of the bell housing of the transmission, said rear unit being substantially equal in longitudinal extent with the gear box of the transmission and is arranged to occur thereabout.

4. A combination as set forth in claim 1 which further includes a horizontal floor structure with a central longitudinally extending, upwardly projecting and downwardly opening channel in which the upper portion of the gear box is arranged with clearance and wherein the elongate tubular shield is substantially equal in longitudinal extent with the gear box of the transmission and is arranged to occur thereabout, and to freely occur between the gear box and the floor structure.

5. A combination as set forth in claim 1 which further includes a horizontal floor structure rearward of the engine and bell housing and overlying the gear box and a substantially vertical fire wall structure with a forwardly and upwardly inclined lower portion projecting upwardly from the floor structure in close proximity with and overlying the bell housing and wherein the elongate tubular shield is substantially equal in longitudinal extent with the bell housing and is rearwardly convergent whereby said shield substantially conforms to the exterior configuration of the bell housing of the transmission, said shield occurring between the bell housing and the adjacent portion of the fire wall structure with working clearance.

6. A combination as set forth in claim 1 which further includes a horizontal floor structure rearward of the engine with a central longitudinally extending, upwardly projecting and downwardly opening channel in which the upper portion of the gear box is arranged with clearance, and a substantially vertical fire wall structure with a forwardly and upwardly inclined lower portion projecting upwardly from the floor structure and in close proximity with and overlying the bell housing, said shield being divided longitudinally into front and rear units, said front unit being substantially equal in longitudinal extent with the bell housing and rearwardly convergent whereby said shield unit substantially conforms to the exterior configuration of the bell housing of the transmission, said rear unit being substantially equal in longitudinal extent with the gear box of the transmission and is arranged to occur thereabout, the portions of the units overlying the gear box and the bell housing occurring between the gear box and the floor structure and between the bell housing and fire wall structure with working clearance.

7. A combination as set forth in claim 1 wherein the elongate tubular shield is substantially equal in longitudinal extent with the bell housing and is rearwardly convergent whereby said shield substantially conforms to the exterior configuration of the bell housing of the transmission, said shield being sectional and having a downwardly opening U-shaped upper section with radially inwardly and rearwardly inclined longitudinally extending sides and an upwardly opening U-shaped lower section with substantially straight, axially extending sides, the ends of the U-shaped sections occurring in lapped relationship and having registering fastener receiving openings, and screw fastening means engaged through said openings and releasably securing the related ends of the sections together.

8. A combination as set forth in claim 1 which further includes a horizontal floor structure rearward of the engine and bell housing and overlying the gear box and a substantially vertical fire wall structure with a forwardly and upwardly inclined lower portion projecting upwardly from the floor structure in close proximity with and overlying the bell housing and wherein the elongate tubular shield is substantially equal in longitudinal extent with the bell housing and is rearwardly convergent to conform generally to the exterior configuration of the bell housing of the transmission, said shield occurring between the bell housing and the adjacent portion of the fire wall structure with working clearance, said shield being sectional and having a downwardly opening U-shaped upper section with radially inwardly and rearwardly inclined longitudinally extending sides and an upwardly opening U-shaped lower section with substantially straight, axially extending sides, the ends of the U-shaped sections occurring in lapped relationship and having registering fastener receiving openings, and screw fastening means engaged through said openings and releasably securing the related ends of the sections together.

9. A combination as set forth in claim 1 wherein the elongate tubular shield is substantially equal in longitudinal extent with the gear box of the transmission and is arranged to occur thereabout, said shield being sectional and having upper and lower opposing U-shaped sections with overlapped leg end portions with registering openings, and screw fastener means engaged through said openings and releasably securing the sections together.

10. A combination as set forth in claim 1 which further includes a horizontal floor structure with a central longitudinally extending, upwardly projecting and downwardly opening channel in which the upper portion of the gear box is arranged with clearance and wherein the elongate tubular shield is substantially equal in longitudinal extent with the gear box of the transmission and is arranged to occur thereabout, and to freely occur between the gear box and the floor structure, said shield being sectional and having upper and lower opposing U-shaped sections with overlapped leg end portions with registering openings, and screw fastener means engaged through said openings and releasably securing the sections together.

11. A combination as set forth in claim 1 which further includes a horizontal floor structure rearward of the engine with a central longitudinally extending upwardly projecting and downwardly opening channel in which the upper portion of the gear box is arranged with clearance, and a substantially vertical fire wall structure with a forwardly and upwardly inclined lower portion projecting upwardly from the floor structure and in close proximity with and overlying the bell housing, said shield being divided longitudinally into front and rear units, said front unit being substantially equal in longitudinal extent with the bell housing and rearwardly convergent whereby said shield unit substantially conforms to the exterior configuration of the bell housing of the transmission, said rear unit being substantially equal in longitudinal extent with the gear box of the transmission and is arranged to occur thereabout, the portions of the units overlying the gear box and the bell housing occurring between the gear box and the floor structure and between the bell housing and fire wall structure with working clearance, the units being sectional and having opposing upper and lower U-shaped sections with overlapping leg end portions with registering openings, and screw fastener means engaged through said openings to releasably secure the adjacent ends of related sections together, the upper and lower sections of the rear unit and the lower section of the front unit having straight axially extending sides, the upper section of the front unit having rearwardly and radially inwardly inclined sides.

References Cited
UNITED STATES PATENTS

| | | | |
|---|---|---|---|
| 926,800 | 7/1907 | Young | 74—608 |
| 2,324,693 | 7/1943 | Griswold et al. | |
| 2,685,874 | 8/1954 | Ford | 74—608 |
| 2,923,305 | 2/1960 | Cline | 150—52 |

A. HARRY LEVY, Primary Examiner

U.S. Cl. X.R.

74—608; 89—36; 102—22; 150—52; 180—1, 70